United States Patent Office 3,335,811
Patented Aug. 15, 1967

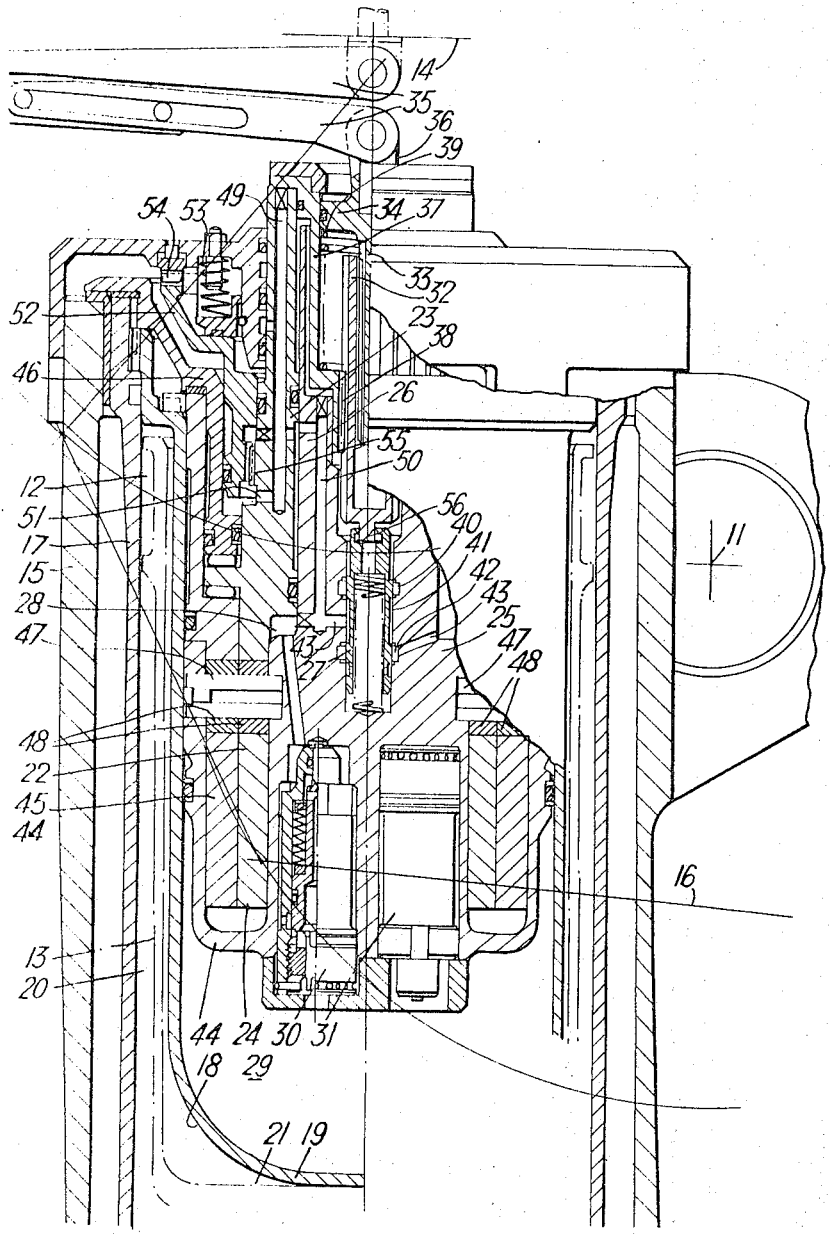

3,335,811
AIRCRAFT UNDERCARRIAGES
Harold Cyril Anthony Ralph, Stevenage, and Charles W. May, St. Albans, England, assignors to Hawker Siddeley Dynamics Limited, Hatfield, England, a British company
Filed Aug. 25, 1965, Ser. No. 482,468
13 Claims. (Cl. 180—79.2)

ABSTRACT OF THE DISCLOSURE

A steering nose wheel leg for aircraft undercarriages provided with a fluid pressure operated piston-and-cylinder type steering actuator in which linear motion of the actuator piston is translated into rotary steering motion by means of a cam track and follower mechanism; the piston having a number of radial pins bearing cam follower rollers which work in cam slots, each of part-helical configuration, formed in the wall of the cylinder surrounding the piston so that relative linear motion of the piston and cylinder is accompanied by relative rotation; the cylinder being surrounded by a sleeve similarly provided with helical cam slots, of opposite hand, to cooperate with follower rollers on the pins, whereby a magnification of the rotary motion is obtained in that the amount of relative rotation as between the cylinder and surrounding sleeve is greater than that between either of these members and the piston.

---

This invention relates to aircraft undercarriages, and more particularly steering nosewheel legs.

Most previous aircraft nosewheel power steering mechanisms have been of the type wherein a crank lever transmits the effort of a powered actuator to the rotary part of the leg. This, however, gives rise to rapid reduction of steering torque at large steering angles due to crank geometry. It is a primary object of this invention to achieve an acceptable arrangement in which the steering torque is constant.

According to the present invention a fluid pressure operated piston and cylinder type steering actuator is provided for an undercarriage leg in which linear motion of the actuator piston is translated into rotary steering motion by means of a cam track and follower mechanism.

In the preferred arrangement, the piston has a number of radial pins bearing cam follower rollers and these work in cam slots each of part helical configuration formed in the wall of a cylinder surrounding the piston so that relative linear motion of the piston and cylinder is accompanied by relative rotation. And if the cylinder is surrounded by a sleeve similarly provided with helical cam slots, of opposite hand, to cooperate with follower rollers on the pins a magnification of the rotary motion can be obtained in that the amount of relative rotation as between the cylinder and the surrounding sleeve is greater than that between either of these members and the piston.

Such a rotary actuator may be servo-controlled, and may be operated either mechanically or electrically. It has the distinct advantage that it can be readily built into the main outer case of the undercarriage leg, thus eliminating the need for heavily-stressed lugs, machined notches and so forth, on the leg exterior for steering purposes. This not only means a tidier appearance of the undercarriage but the whole steering mechanism is protected from damage, and as most of the moving parts are submedged in the operating hydraulic fluid, lubrication and corrosion problems are negligible.

The accompanying drawing shows, in longitudinal section, an example of an aircraft nosewheel leg in accordance with the invention. The example is deliberately chosen as possibly the most difficult configuration that is encountered when installing a steering mechanism. The leg is an oleo-pneumatic telescopic leg and there is very little head room between the retraction axis 11 of the leg and the aircraft floor line 14.

The upper telescopic member of the leg comprises a non-rotary outer cylinder 15 mounted to swing up and back about the retraction axis 11 so as to turn the leg from the extended position as shown to the retracted position in which the axis of the leg lies along the line 16. Within the outer cylinder 15 is a rotary sleeve 17 from which the steering motion is transmitted to the wheels by means of torque links (not shown).

The steering actuator 18 is housed in the upper part of the leg, for the most part within the sleeve 17, and, except at the upper end, there is an annular gap 20 between the sleeve 17 and the outer casing 19 of the actuator. When the leg contracts the inner lower member 13 of the telescopic pair slides up into the annular gap 20, said member having its upper end quite deeply cupped, as at 21, so as not to be hindered from doing this by the presence of the actuator 18.

The actuator 18 includes a cylinder member 22 which is open at its lower end and has an upper part 23 of smaller internal diameter than the lower part 24. An actuator piston 25 slides in the lower part 24 of the cylinder 22 while its piston rod 26 makes a sliding fit in the upper part 23 of the cylinder. Within the piston 25 and rod 26 is a spool valve 27 which moves linearly to control the admission and exhaust of pressure fluid to and from the fluid chambers 28, 29 at opposite ends of the piston, and hence determines the position to which the piston 25 moves in the cylinder 22. Valves 30, 31 are essentially pressure relieving valves, venting oil pressure to drain if excessive torque is applied to the leg. e.g. due to the nose wheel striking a runway curb during taxying.

The spool valve 27 is moved by a quill 32 having internal splines that cooperate with splines on a rod 33. This rod has a head 34 which is connected via lugs 36 to links 35 which are in turn connected to the pilot's steering wheel, and provides the rotary control input to the actuator. Rotary movement of the rod 33 and consequently of the quill 32, is transformel into linear movement by interaction of a multi-start or Archimedes thread 38 connecting the quill 32 to the stationary sleeve member 37. The quill 32 transmits linear movement to the spool 27 in both directions via a motion-transmitting coupling 56. The backlash in both directions is eliminated by a compression spring 39. The spool valve 27 is of the servo follow-up type in that movement of the valve in either direction from a neutral position causes flow of pressure fluid through the valve ports 40, 41, 42 and passages 43 associated therewith in such a manner as to bring about movement of the piston 25 in that same direction which movement continues until the initial neutral positional relationship of the valve and piston is restored.

The cylinder member 22 has an external diameter that is considerably less than the internal diameter of the casing 19 of the actuator so that there is a comparatively wide annular gap between them. The actuator piston 25 always projects downwardly through the open end of the cylinder 22 and it is of inverted mushroom configuration with an upturned skirt 44 that has its outer wall surface in sliding contact with the inner vertical wall of the actuator casing 19. Between the inner vertical wall of the piston skirt 44 and the outer wall of the cylinder member 22 there is an annular gap in which is disposed a rotary sleeve member 45 that is in sliding contact with both the piston skirt and the cylinder. The sleeve member 45 is held against axial movement relative to the cylinder 22 but is able to rotate relatively thereto. The upper end of the sleeve member 45 surrounds a portion of a further sleeve 46 and is keyed to the actuator casing 19 as at 60. The actuator casing 19 is in turn keyed at 62 to the rotary sleeve 17. Therefore, the sleeve member 45, the actuator casing 19 and the sleeve 17 rotate as a single unit.

Extending between the vertical portion of the piston skirt 44 and the main body of the actuator piston 25 through the sleeve member 45 and the wall of the cylinder 22, are a number of radial pins 47 carrying pairs of loose rollers 48, 63. The cylinder 22 has slots 64 formed in it which are equal in number to the number of radial pins and follow part-helical paths, and one roller 63 of the pair on each pin 47 lies in a slot 64 of the cylinder member 22. The sleeve member 45 likewise has slots 65 formed in it which follow part-helical paths, and the other roller 48 of the pair on each pin 47 lies in a slot 65 of the sleeve member 45. The helical slots 64 in the cylinder member 22 are of opposite hand to those in the sleeve member 45, and during the normal operation of power steering the cylinder member 22 is held against rotation by clutch means as hereinafter described. As the actuator piston 25 slides linearly in the nonrotating cylinder 22, it also has a component of rotation due to the coaction of the rollers 63 on the roller-bearing pins 47 and the helical slots 64 in the cylinder. If one now considers relative linear sliding of the piston 25 and the sleeve member 45, ignoring the rotation of the piston just mentioned but assuming for the moment that the piston is held against rotation, it will be understood that the sleeve member 45 rotates since it has a rotational component due to coaction of its helical slots 65 and the rollers 48 on the pins 47. Now since the piston 25 and the pins 47 thereon already have a rotational component as described, and the helical slots 64, 65 in the cylinder 22 and the sleeve member 45 are of opposite hand, the two rotational components are additive and the sleeve member 45 rotates in the same direction as the piston 25 but at a faster rate. In this way relative linear movement of the actuator piston 25 and cylinder 22 is translated into rotational movement of the piston itself and also faster rotational movement of the sleeve 45. The rotation of the sleeve 45 is transmitted to the sleeve 17 for steering the wheels since as already explained the sleeve 45, the actuator casing 19 and the sleeve 17 all rotate as one.

To enable the nosewheels to castor freely through a full 360° of travel the cylinder member 22 is released for rotation when the supply of pressure fluid to the steering actuator is shut off. So long as pressure exists in the passages 49, 50 supplying pressure fluid to the spool valve 27 there will be pressure admitted through a port 51 to the underside of an annular piston 68 which is an integral part of a clutch member 52, and this causes the clutch member to be held up, against the action of springs 53, so that dogs 54 thereon are in engagement with cooperating non-rotary dogs carried by the upper end of the leg casing. Since the clutch member 52 and the cylinder member 22 are prevented from relative rotation by cooperating splines 55, the cylinder member 22 is also at this time non-rotary. But when the pressure is released the clutch member 52 will be thrust down by the springs 53 to disengage the dogs and thereby free both the clutch member 52 and the cylinder 22 for rotation.

Not only does the arrangement described provide a nosewheel leg in which the steering actuator is neatly housed within the leg but also the ratio of linear input movement to angular output movement for the actuator can readily be selected by appropriate choice of the helix angles for the slots in the members 22 and 45. Furthermore, it will be appreciated that the actuator construction lends itself to adjustment of the steering ratio or sensitivity; thus, if means is provided whereby the cylinder 22 can be released for rotation during power steering while the piston 25 is locked against rotation the rotational movement of the sleeve 45 will possess only the one component due to coaction of its helical slots 65 and the rollers 48 on the pins 47 and so will turn less for a given linear movement of the actuator piston. This is particularly advantageous in providing a higher degree of steering sensitivity, i.e. a reduced amount of turn for a given control movement, at high taxying speeds and a lower sensitivity, with larger angles of turn, at low taxying speed. It is important that too much turn should not be put on during high speed taxying as this produces excessive tyre wear.

For articulated undercarriages, the installation of this type of steering would prove a much easier proposition due to the extra height usually available above the shock absorber unit. In addition, the rotary sleeve 17 and torque links would no longer be required.

Further modifications of the arrangement described that are possible without departing from the scope of the invention include providing the slots in either or both the members 22 and 45, with a progressively changing helix angle, and disposing the actuator assembly outside the leg casing.

The steering torque available is dependent upon the size of the actuator piston and the hydraulic pressure used in the actuator. Torque outputs can be achieved, without undue weight penalty, that will satisfy the requirements of the largest of aircraft in the foreseeable future.

We claim:
1. A retractable undercarriage leg for a steerable aircraft wheel assembly, including a fluid-pressure-operated steering actuator comprising a cylinder, a piston sliding in the cylinder and also able to rotate therein, the cylinder being provided with a series of cam slots of part helical configuration in its wall surrounding the piston, a plurality of radial pins borne by the piston and fitted with cam follower rollers which work in said cam slots whereby relative linear motion of the piston and cylinder is accompanied by relative rotation, a sleeve coaxial with and surrounding the cylinder and able to rotate relatively to the cylinder, said sleeve also having cam slots of part-helical configuration therein to receive cam follower rollers on said radial pins, the helical cam slots in the sleeve being of opposite hand to those in the cylinder whereby relative linear motion of the piston and cylinder is accompanied by rotation of said sleeve relative to the cylinder at a faster rate than the piston, and means coupling the sleeve to the wheel assembly for applying the rotation of said sleeve to steer said wheel assembly.

2. A leg according to claim 1, wherein the piston extends out of the end of the cylinder and is of mushroom configuration with a skirt surrounding the cylinder externally and spaced therefrom, the aforesaid sleeve being a sliding fit between the cylinder exterior and the piston skirt.

3. A leg according to claim 1, wherein the actuator piston contains a servo-valve to control the admission and exhaust of pressure fluid to and from the chambers of the actuator cylinder.

4. A leg according to claim 3, wherein a rotary input member is coupled to a spool of the servo-valve in such manner that input rotational movement is translated into linear movement of the valve spool.

5. A leg according to claim 4, wherein the linear movement is imparted to the valve spool by a quill that is coupled by means of splines to the rotary input member, the quill being in threaded engagement with a non-rotary member whereby rotation of the quill causes it to move axially.

6. A leg according to claim 5, wherein the actuator is housed in the top end of the outer of two telescopic leg members, the inner member extending below the outer and carrying the ground wheel or wheels.

7. A leg according to claim 6, wherein the actuator is disposed with its axis coincident with the axis of the leg members and the rotary input member extends through the upper end of the outer leg member, the axes of the rotary input member, the servo-valve and the valve quill being likewise coincident with the axis of the leg members.

8. A leg according to claim 7, wherein the actuator has a housing that is attached at its upper end to the upper end of the outer leg member, the major portion of the housing below the attachment location being spaced inwardly from the outer leg member, and when the leg is contracted the inner leg member slides up until its upper end lies in the space between the outer leg member and the actuator housing.

9. A leg according to claim 8, wherein said coupling means comprises a further sleeve lying within the outer leg member and surrounding the inner leg member, the upper end of this further sleeve being coupled to the aforesaid sleeve of the actuator at a location above that reached by the upper end of the inner leg member.

10. A leg according to claim 9, wherein the skirt of the actuator piston is in sliding contact with the inner wall of the actuator housing.

11. A leg according to claim 1, wherein the actuator cylinder is held against rotation with respect to the leg by a disengageable clutch.

12. A leg according to claim 11, wherein the clutch disengages automatically when fluid pressure is removed from the actuator.

13. A leg according to claim 1, wherein the cam slots have a progressively changing helix angle.

References Cited
UNITED STATES PATENTS

| | | | |
|---|---|---|---|
| 2,420,825 | 5/1947 | Hutton | 74—89.15 |
| 2,949,256 | 8/1960 | Stout | 244—50 |
| 2,959,978 | 11/1960 | Boutwell | 74—89.15 |
| 2,970,792 | 2/1961 | Holmes | 244—50 |
| 3,141,387 | 7/1964 | Geyer | 74—89.15 |

BENJAMIN HERSH, *Primary Examiner.*

MILTON BUCHLER, *Examiner.*

J. H. BRANNEN, *Assistant Examiner.*